Figure 1:
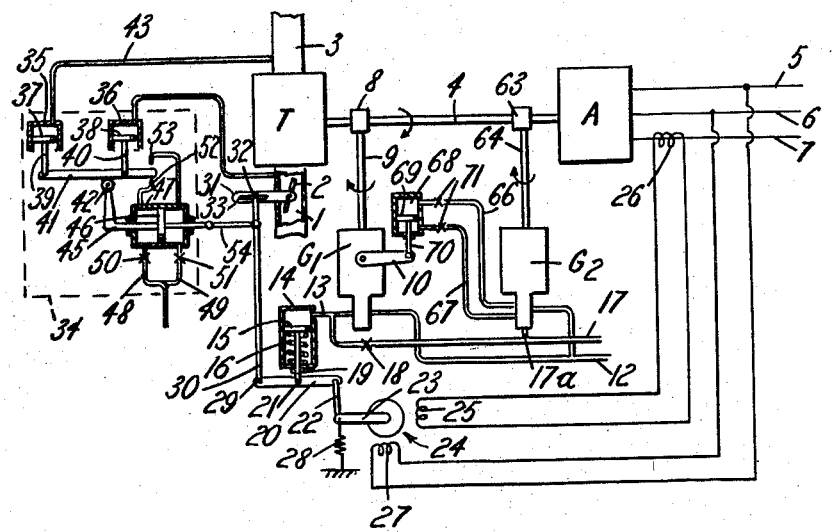

March 1, 1960   J. A. CHILMAN   2,926,681
SPEED GOVERNING SYSTEMS FOR TURBINES
Filed May 28, 1956   3 Sheets-Sheet 1

March 1, 1960    J. A. CHILMAN    2,926,681
SPEED GOVERNING SYSTEMS FOR TURBINES
Filed May 28, 1956    3 Sheets-Sheet 2
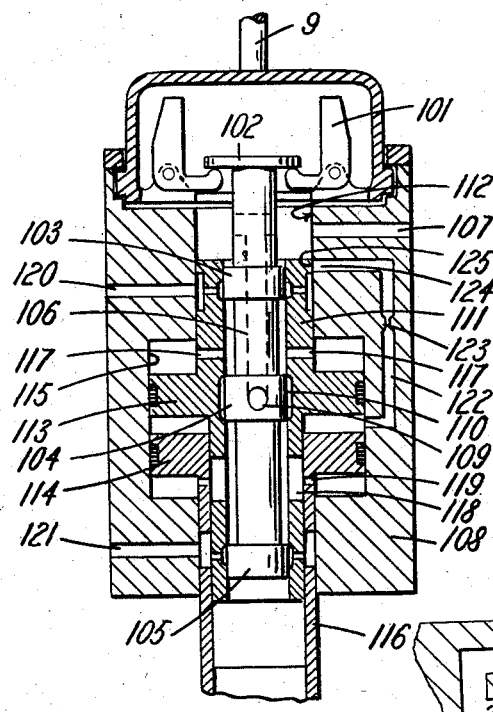
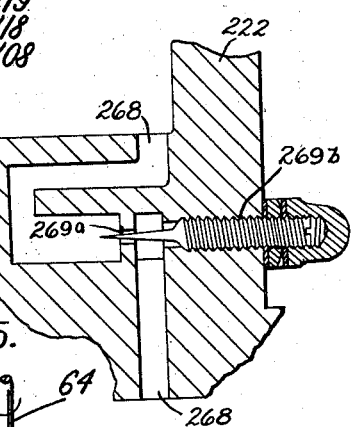
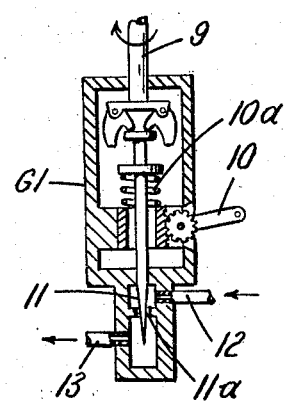
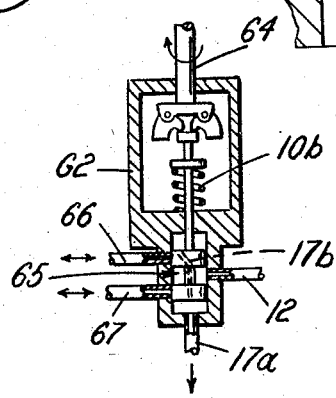

March 1, 1960  J. A. CHILMAN  2,926,681
SPEED GOVERNING SYSTEMS FOR TURBINES
Filed May 28, 1956  3 Sheets-Sheet 3

2,926,681

SPEED GOVERNING SYSTEMS FOR TURBINES

John Alfred Chilman, Gloucester, England, assignor to Rotol Limited, Gloucester, England, a British company Application May 28, 1956, Serial No. 587,741

Claims priority, application Great Britain May 31, 1955

6 Claims. (Cl. 137—34)

This invention relates to governing systems for turbines which are subject to or are controlled by changes of pressure ratio across their blading and which have a torque-speed relationship the steepness of which varies with such changes of pressure ratio. Thus, for example, the invention may be applied to the control of an air-driven turbine in an aircraft, the air being derived possibly from a forwardly directed inlet so that the maximum pressure ratio available across the turbine blading varies with the speed of the aircraft, and the turbine being controlled by throttling means either upstream or downstream of its blading so that the pressure-ratio effective across the blading is further varied. Such turbines normally have a torque-speed relationship which droops more steeply as the pressure ratio across the blading increases.

The object of the present invention, is to provide an improved speed governing system for use with such turbines.

According to the present invention there is provided a speed governing system for a turbine subject to or controlled by changes of pressure ratio across its blading, which turbine has a torque-speed relationship the steepness of which varies with such changes of pressure ratio across its blading, said speed governing system comprising turbine speed controlling means adjustable to alter the speed of the turbine, and speed responsive governing means responsive to change of speed of the turbine and operable to adjust said turbine speed controlling means to restore the turbine to a steady speed after a disturbance in the speed of the turbine, said speed responsive governing means being such that it has a drooping characteristic.

For stability, a governed system necessarily has a drooping characteristic, that is to say an increase of torque is accompanied by a decrease of speed and vice versa. The amount of this droop depends upon two factors namely the inherent droop of the torque-speed relationship of the ungoverned turbine and the sensitivity of the governor. By "sensitivity" is meant the relation between the amount of a speed change and the amount of corrective action thereby initiated by the governor. Any governed system has an optimum droop of its characteristic such that it regains steady speed in the minimum of time. If the amount of droop is less than this optimum value there will be an increased tendency for the speed of the system to "hunt" above and below the new steady speed to which it will finally settle down, while if the amount of droop is more than the optimum value the system will not hunt but will only approach the new steady speed asymptotically.

According to a feature of the present invention, in cases where the change of pressure ratio across the blading of the turbine which are to be encountered in practice give rise to excess deviation from the optimum droop of the characteristic of the system said speed responsive governing means may be of adjustable sensitivity (as hereinbefore defined), and said system may further comprise means responsive to changes of pressure ratio across the blading of the turbine for adjusting the sensitivity of the said governing means in the sense to oppose changes in the time taken for said speed responsive governing means to restore the turbine to a steady speed after a disturbance in the speed of the turbine.

When the above feature is adopted it is preferred that said pressure ratio is arranged to adjust the sensitivity of said speed responsive governing means to produce for any prevailing pressure ratio across the blading of the turbine within a desired working range of such pressure ratios the optimum droop of the characteristic of the governed turbine system for that prevailing pressure ratio.

According to another feature of the present invention, when it is desired that the turbine should run at a constant speed said speed responsive governing means may be of the variable datum kind and said system may further comprise a second speed responsive governing means responsive to a difference between the actual speed of the turbine and a preselected speed for adjusting the datum of said first said speed-responsive governing means in the sense to cause the elimination of such difference, other means also being provided to prevent appreciable alteration of the drooping characteristic of said first said speed-responsive governing means by said second speed-responsive governing means.

In operation, the first said speed-responsive governing means of a system as just defined makes a speed correction consequent upon a disturbance of the speed of the turbine, but, by virtue of the drooping characteristic of the first said speed-responsive governing means the new speed differs somewhat from the initial speed, the second speed responsive governing means then comes into action to adjust the first said speed-responsive governing means so as to cause a return to the initial speed.

Said other means acts to delay the action of the second speed-responsive governing means upon the first said speed-responsive governing means since if the second speed-responsive governing means were allowed to perform its correction in the same interval of time as the first said speed-responsive governing means the effect would be to steepen the operating time of the first said speed-responsive governing means and induce hunting of the system.

According to another feature of the present invention a speed governing system for a turbine having a variable load, may further comprise load responsive governing means responsive to changes of load on the turbine and operable in combination with said first said speed responsive governing means to adjust said turbine speed controlling means, said load responsive governing means acting to anticipate disturbances in the speed of the turbine and to effect a preliminary adjustment of said turbine speed controlling means.

Figure 2:
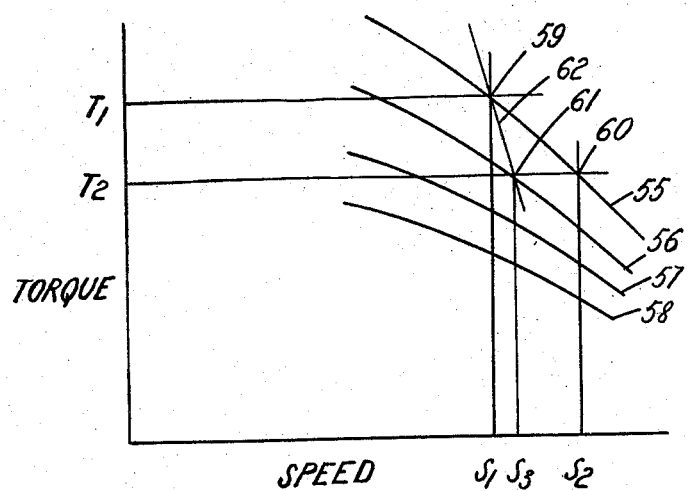
Figure 6:
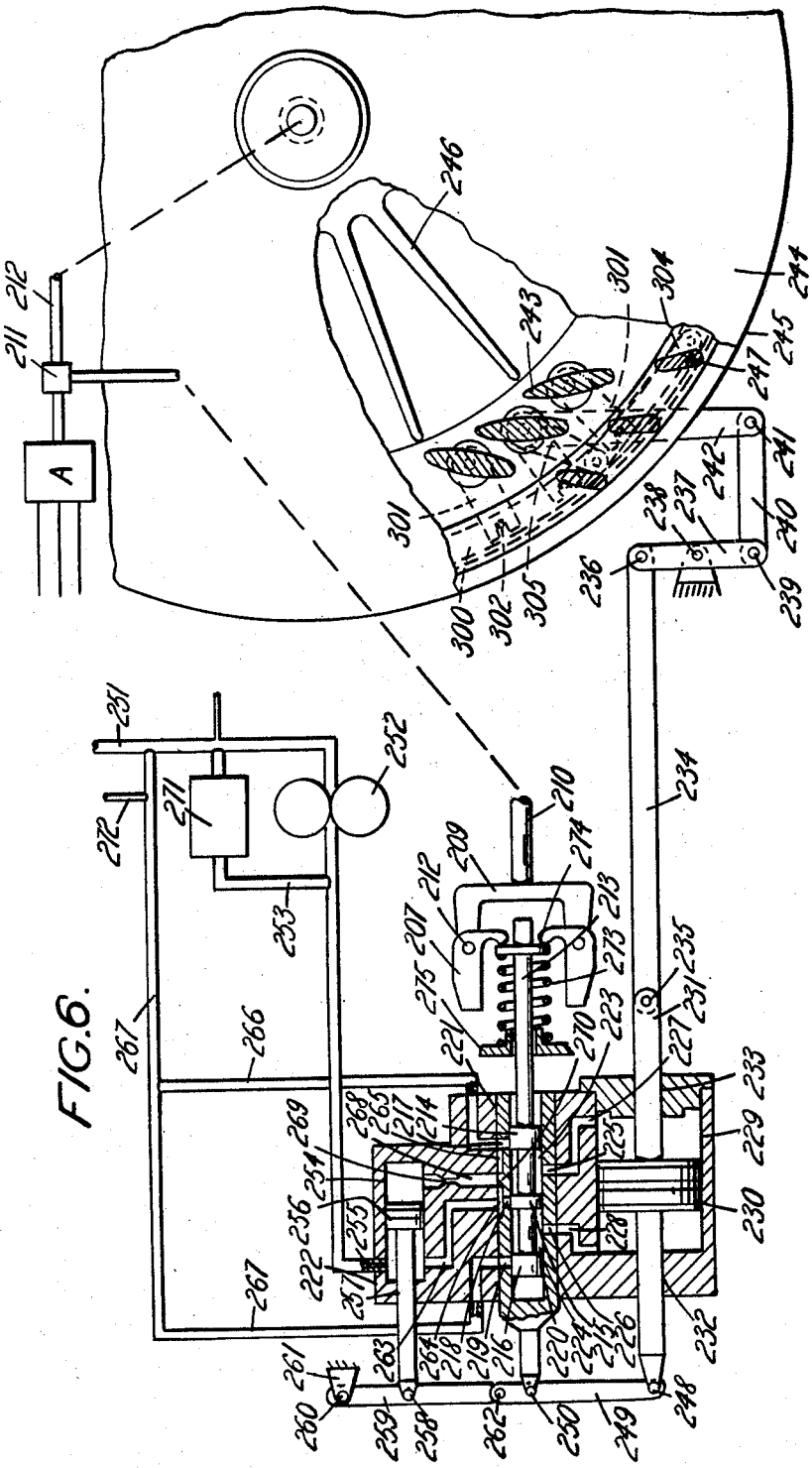

Specific embodiments of the invention will now be described, merely by way of example, with reference to the accompanying drawings in which:

Figure 1 shows, diagrammatically, a turboalternator system, having a speed governing system according to the present invention, Figure 2 represents graphically the torque-speed characteristics of the turbine, Figure 3 shows a modification of part of the system shown in Figure 1, Figures 4 and 5 are cross-sectional views showing details of construction of parts of the speed governing system shown in Figure 1, Figure 6 shows another speed governing system according to the present invention, and Figure 7 is a partial view showing a modification which may be incorporated in the governing system shown in Figure 6.

In Figure 1 a turbine T has a working fluid supply duct 1 containing turbine speed controlling means in the form of a throttle valve 2, an exhaust duct 3 and a shaft 4 by which it is coupled to drive a three-phase alternator A the output lines of which are indicated at 5, 6 and 7. A variable datum speed governor $G_1$ of the centrifugal type (see also Figure 4) is driven from the shaft 4 through an angle drive 8 and a shaft 9 and comprises a lever 10 by means of which its speeder spring 10a may be adjusted in well known manner to alter the datum setting of the governor, the governor further comprising a hydraulic valve 11 operable by the centrifugal governor. The valve 11 is a needle valve movable to adjust the area of a variable area orifice 11a, and the valve controls the admission of hydraulic fluid under a controlled steady pressure supplied through a pipe 12 from a suitable source (not shown) to a pipe 13 leading to a single acting fluid operated servo motor in the form of a cylinder 14 containing a piston 15, movement of which under the action of fluid pressure in the cylinder is opposed by a spring 16. A bleed from the cylinder 14 is formed by a pipe 17 branching from the pipe 13 the pipe 17 containing a restriction 18 and leading back to a fluid reservoir (not shown). The piston 15 is provided with a piston rod 19 pivoted to a differential lever 20 at an intermediate point 21. One end of the lever 20 is connected by a link 22 to an arm 23 rigidly carried on the shaft of a two-phase motor 24 having one phase winding 25 supplied by a current transformer 26 in the output line 7 and the other phase winding 27 connected between the other two output lines 5 and 6. Torque proportional to the electrical loading of the alternator A is thus developed by the motor 24 and is opposed by a spring 28 so that the position taken up by the arm 23, and, therefore, the position of the end of the differential lever 20 connected to the link 22, is dependent upon the electrical load on the alternator. The motor 24 and its associated electrical connections together with the spring 28 therefore constitute a load responsive governing means responsive to changes of load on the turbine.

It will also be understood that the position of the pivot 21 by which the piston rod 19 is connected to the lever 20 is dependent upon speed since the valve 11 and other parts of the hydraulic system described simply serve to amplify the displacements of the governor $G_1$. Movements of the other end 29 of the lever 20 are, therefore, compounded of a load-responsive component fed in by the motor 24 and a speed-responsive component fed in by the piston 15.

The end 29 of the lever 20 is connected by a rod 30 to an arm 31 attached to the spindle of the throttle valve 2, the connection of the rod to the arm including a pin 32 engaging in a slot 33 in the arm so that by varying the position of the pin and therefore the rod/arm connection along the slot towards and away from the spindle of the throttle valve the ratio of the movement of the throttle valve 2 to the movement of the end 29 of the differential lever 20 may be adjusted, such adjustment in effect varying the sensitivity of the governor $G_1$.

The position of the pin 32 along the slot 33 is controlled by a device 34 sensitive to the pressure ratio across the blading of the turbine T, the said device comprising two cylinders 35 and 36 of equal cross-section containing pistons 37 and 38 connected by rods 39 and 40 to two points on a balance beam 41 having a movable fulcrum 42. The cylinders are connected respectively by pipes 43 and 44 with the exhaust and supply ducts 3 and 1, so that the pistons are loaded by the pressures therein, and the means is maintained in a state of balance by arranging the fulcrum 42 on the rod 45 of a piston 46 working in a cylinder 47, hydraulic fluid under pressure being admitted to both ends of the cylinder by pipes 48 and 49 containing restrictions 50 and 51 and being allowed to escape through jets 52 and 53 which are obstructed differentially by the beam 41. If through a change in the ratios of the pressures the balance of the beam is upset, a pressure differential is established across the piston 46 in the sense to move the fulcrum 42 in the direction to restore the state of balance. The position of the fulcrum, and therefore of the piston 46, is a measure of the pressure ratio, so that by connecting the upper end of the rod 30 to the piston by a link 54 the position of the pin 32 along the slot 33 is determined by the pressure ratio.

The operation of the system, as so far described, will be explained with reference to Figure 2 in which the curves 55, 56, 57 and 58 show the relation between torque, measured vertically, and speed, measured horizontally, at different pressure ratios across the turbine blading. Supposing the system to be running at a condition corresponding to the point 59 on the curve 55 at which the torque is $T_1$ and the speed $S_1$ when the load is suddenly reduced so that the torque falls to $T_2$. If no change is made in the setting of the throttle valve 2 the speed will increase to $S_2$, the new operating point 60 remaining on the curve 55. Considering only the effect of the governor $G_1$, the increase of speed causes a displacement of the governor mechanism and therefore of the points 21 and 29 of the differential lever 20 which at any instant is substantially proportional to the change of speed, and the throttle valve 2 is accordingly progressively closed as the speed rises, thereby reducing the pressure ratio across the turbine blading. Supposing that by the time equilibrium has been regained the pressure ratio has been reduced to that corresponding to the curve 56, the new operating point will be the point 61 and the speed will only have increased to $S_3$ instead of $S_2$. The effect of the governor will thus have been to cause the operating point to travel along the line 62 instead of the line 55. Now it is known that for a governed system to regain a state of equilibrium in a minimum time after experiencing a disturbance the slope of the effective operating line, such as 62, is critical. If the slope is increased above the critical value the system will "hunt" to an increasing extent above and below the new equilibrium speed, the oscillations taking longer to die out as the steepness is increased. If on the other hand the slope is decreased below the critical value the actual speed approaches the new equilibrium speed asymptotically, the time to achieve practical coincidence increasing with decrease of slope. It is therefore advantageous to compensate the system to avoid the change of slope of the effective operating line which is introduced when working over a range of pressure ratios owing to the fact that the characteristic lines 55, 56 etc. of the ungoverned turbine are not parallel to one another. In the arrangement shown in Figure 1 this is effected by adjustment of the sensitivity of the governing system by means of the device 34 which is responsive to the pressure ratio across the turbine blading.

In the arrangement of Figure 1 the load responsive part of the system, comprising the two-phase motor 24, relieves the governor $G_1$ of part of the work which would otherwise fall upon it since it anticipates a change of speed when an alteration occurs in the load and introduces an approximate correction component before any change of speed has necessarily occurred.

When the system as so far described has regained equilibrium after a disturbance the new speed is necessarily different from the original speed by the amount necessary to displace the governor $G_1$ mechanism sufficiently to establish the new conditions. To regain the original speed a second speed responsive governor $G_2$ is provided in Figure 1 which is also driven from the shaft 4 by an angle drive 63 and shaft 64. The governor $G_2$ is also of the centrifugal type and has an hydraulic valve 65, see Figure 5, which is displaceable from an equilibrium or "on speed" position upwardly in Figure 5 to admit hydraulic fluid under pressure from the supply pipe 12 to the pipe 66, and downwardly in Figure 5 to admit hydraulic fluid under pressure to the pipe 67, the pipes 66 and 67 leading to opposite ends of a cylinder 68 of a double acting hydraulic servo motor having a piston 69 connected by a piston rod 70 to the datum-adjusting lever 10 of the governor $G_1$. When displaced from its equilibrium position in the direction to supply hydraulic fluid under pressure to the pipe 66 the valve 65 communicates the pipe 67 with the pipe 17 through a pipe 17a and the space in the valve casing below the valve, and when displaced from its equilibrium position in the direction to supply hydraulic fluid under pressure to the pipe 67 the valve 65 communicates the pipe 66 with the pipe 17 through the pipe 17a the aforesaid space, a bore 17b in the valve and the space in the valve casing above the valve.

In operation the governor $G_2$ adjusts the datum of the governor $G_1$ to eliminate any speed-error detected by the governor $G_2$ with reference to its datum setting. However, inasmuch as such an adjustment if made in a time interval of the same order as that taken by the governor $G_1$ to restore equilibrium after a disturbance would in effect steepen the operating line of the governor $G_1$ and thus induce hunting, restrictions 71 are provided in one or both the pipes 66 and 67 to slow down the resetting of the datum of the governor $G_1$ sufficiently to avoid this difficulty.

The governor $G_2$ shown in Figure 5 has a fixed datum setting determined by the loading in its speeder spring 10b. If it is desired that the turbine be controlled to run at a number of different speeds means may be provided as shown in Figure 4 for adjusting the loading in the spring 10b to alter the datum of the governor $G_2$.

In Figure 3 is shown a valve and servo assembly which may form part of the governor unit $G_1$ of Figure 1 in replacement of the governor $G_2$ and the parts associated therewith. At 101 are shown the flyweights of the governor $G_1$ acting upon a piston type valve member 102 having three lands 103, 104 and 105. A passage 106 is formed internally in the valve member 102 and is in constant communication at its upper end with a port 107 in the casing 108 to which hydraulic liquid is supplied under pressure. The passage 106 also communicates through a port 109 opening through the land 104 into a groove 110 formed in a sleeve 111 surrounding the valve 102 and sliding in a bore 112 in the casing 108. The sleeve 111 carries a fixed piston 113 and a sliding piston 114, both pistons working in a cylinder 115 formed in the casing. The sliding piston 114 is fixed to a sleeve 116 which slides between the sleeve 111 and the casing and projects through the bottom of the latter for attachment by pin 21 to the lever 20 of Figure 1. The space between the valve lands 103 and 104 communicates through ports 117 in the sleeve 111 with the space above the fixed piston 113, while the space between the lands 104 and 105 similarly communicates through ports 118 and 119 with the space below the sliding piston 114. Thus if, for example, an increase of speed causes the valve 102 to be raised, liquid under pressure supplied to the groove 110 will be able to flow into the space between the lands 104, 105 and thus act upon the underside of the sliding piston 114. Conversely, downward movement of the valve 102 permits liquid to act upon the upper surface of the fixed piston 113. Exhaust from the cylinder chambers above the piston 113 and below the piston 114 to drain ports 120 and 121 respectively in the casing is controlled by the lands 103, 105 of the valve, so that if, for the moment, the pistons 113 and 114 are considered to be locked together as by a volume of liquid trapped between them, they will follow up movements of the valve 102, the arrangement constituting a pilot valve and a servo piston, the latter moving the sleeve 116 and consequently adjusting the throttle 2 through the linkage shown in Figure 1.

A passage 122 containing a restriction or orifice 123 leads from the space between the pistons 113, 114 to a port 124 which in the "on speed" position of the valve 102 and the fixed piston 113 is blanked off from drain on one side and from supply on the other side by a land 125 on the fixed piston sleeve 111. The restriction 123 passes only a small flow of liquid so that on the occurrence of a speed error the pistons 113, 114 initially move as one as described above, applying to the throttle valve 2 a correction which results in a new stable condition at a speed differing from the initial speed by an amount depending upon the droop incorporated in the system, this droop being adjusted to the optimum value as already explained. Since the speed has changed the port 124 is no longer completely blanked off by the land 125 and liquid can flow slowly from or into the space between the pistons 113, 114, the pistons thus moving slowly towards one another or apart until the speed has been corrected to bring the land 125 into the "on-speed" position blanking off the port 124.

Considering, for example, the case of a reduction of load, the system would, if the restriction 123 were blocked, attain a new higher stable speed corresponding to an upward displacement of the land 125 from the port 124. The land 104 would be centralised with respect to the groove 110 and equal pressures, intermediate between supply and drain pressure, would be acting above and below the pistons 113 and 114 respectively. If the restriction 123 were now unblocked, liquid would flow out from between the pistons to drain with the result that the piston 114 would rise, thereby closing the throttle 2. The resultant fall in speed would cause the valve 102 and piston 113 to move downwardly, the process stopping when the "on speed" position was reached in which the port 124 is closed by the land 125.

Conversely, in the case of an increase in load, liquid flows from supply through the port 124 into the space between the pistons, thus moving the piston 114 downwardly to increase the throttle opening until, due to the increased speed thereby produced the valve 102 and piston 113 are raised into the "on speed" position. It will be seen therefore that the device shown in Figure 3 not only provides a servo action between the mechanism of the governor $G_1$ and the lever 20 but also performs the functions of the governor $G_2$ of Figure 1.

While in Figure 1 the throttle valve 2 has been shown for simplicity as a simple butterfly type of valve it is preferred to use a valve in which the law relating movement of the operating member to effective flow area can be adjusted to give a linear relationship between such movement and the output torque of the controlled turbine.

The speed governing system described with reference to Figure 1 represents a completely compensated system for maintaining the turbine running at a constant speed. In a case where the turbine is required to drive a substantially constant load the load responsive governing means may be omitted from the system, in which case the lever 20 would be pivoted at its end remote from the point 29 to a fixed member.

Further, in certain cases it has been found that the means for adjusting the sensitivity of the governor $G_1$ in response to changes in pressure ratio across the blading of the turbine may also be omitted, in practice, whilst still giving a satisfactory speed governing system. In this case the rod 30 would be connected to the arm 33 by a plain i.e. fixed pivotal connection.

Where constant speeding of the turbine is required the system therefore may be reduced to the variable datum or integrating governor $G_1$ and the proportional governor $G_2$ for adjusting the datum of the governor $G_1$ to maintain the speed of the turbine in accordance with the datum of the governor $G_2$.

The speed governing system shown in Figure 6 incorporates only an integrating governor and a proportional governor, and will now be described.

Referring to Figure 6 the governors together comprise a centrifugal type governor having flyweights 207 pivoted upon a rotatable member 209. This member is driven by a shaft 210, which in turn is driven by an angle drive 211 from the driving shaft 212 between the rotor of an air turbine and an alternator A. The flyweights 207 are operatively associated with a piston type governor valve 213 having lands 214, 215 and 216 integral thereon. These lands register with ports 217, 218 and 219 respectively in a sleeve 220 surrounding the valve 213 which sleeve is axially displaceable in a bore 221 in the governor unit casing 222. The annular spaces 223 and 224 between lands 214 and 215 and 215 and 216 respectively, are in communication through ports 225 and 226 in the sleeve 220 and through passages 227 and 228 in the governor casing 222, with the right and left-hand ends respectively of a cylinder 229. It is arranged that a piston 230 is slidable within this cylinder and a piston rod 231 integral with this piston extends to the left through a suitably sealed aperture 232 to the exterior of the casing, and to the right through a suitable aperture 233 to the exterior. A link 234 is pivoted at 235 to the right-hand end of the piston rod 231 and this link is pivotally connected at 236 to a further link 237. The link 237 is, in turn, pivotally mounted at 238 upon a fixed part, mid-way along its length, while at its lower end, it is pivotally connected at 239 to a link 240. The opposite end of the link 240 is pivotally connected at 241 to a pivoted arm 242 which is capable of adjusting the angular positions of a ring of adjustable vanes 243 of an air turbine, part of which is shown generally at 244. Basically, this air turbine comprises a casing 245, turbine rotor 246, fixed vanes 247 and the adjustable vanes 243 which are positioned in the casing 245 upstream of the rotor 246.

The vanes 243 are angularly adjustable to alter the effective flow area between the vanes, and thereby to adjust the pressure ratio across the blades of the turbine rotor 246 and therefore the speed of the turbine.

In order that movement of the arm 242 may adjust all the vanes 243 together a channel sectioned ring 300 is rotatably mounted in the casing, the ring 300 being disposed radially outwardly of the vanes 243 with the open top of the channel directed inwardly. Each vane 243 has an operating arm 301 extending generally radially outwardly. Each arm is slotted at its outer end which enters the channel sectioned ring and the slot co-operates with a pin 302 arranged transversely of and carried by the ring. When the ring is rotated the pins angularly adjust the arms 301 which in turn adjust all the vanes 243 together. Movements of the arm 242 are transmitted to the ring 300 by a connecting link 304 lying generally along the ring, the link 304 being pivoted at one end to the ring and at its other end to a crank 305 carried on the pivot shaft of the lever 242.

The left-hand extremity of the piston rod 231 is pivotally connected at 248 to a differential lever 249 which, about three quarters of the way along its length from the lower end, in Figure 6 is pivotally connected at 250 to the left-hand extremity of the sleeve 220.

An oil supply conduit 251 from a sump (not shown) is taken to the inlet of a governor pump 252, this pump being driven with the governor flyweights. A conduit 253 is taken from the delivery side of this pump to the upper part of the governor unit casing 222 entering a bore 254 through a port 255. This bore 254 is in parallel disposition with the bore 221 and constitutes a cylinder which houses a piston 256 which is slidable therein. This piston is provided with a piston rod integral therewith which extends through a suitably sealed aperture 257 to the left, to the exterior of the casing.

The left-hand extremity of this rod is pivotally connected at 258 to a second differential lever 259 which, at its upper end in Figure 6, is pivotally connected at 260 to a fixed member 261, while at its lower end it is pivotally connected at 262 to the upper extremity of the lever 249. The conduit 253 enters the bore 254 to the left of the piston 256 and a passageway 263 provided in the casing 222 leads from this bore, immediately opposite the port 255, to the bore 221. At this point it registers with a space or annulus 264 in the sleeve 220 into which the port 218 opens. The port 217 in the sleeve 220 opens into a space or annulus 265 in the sleeve, which annulus registers in the position as drawn, with a conduit 266 which branches into a conduit 267. A passageway 268 is taken from the bore 254, to the right of the piston 256, to the bore 221. This passageway incorporates a fixed area orifice 269. As drawn, a shoulder 270, formed between the annuli 264 and 265, registers with the port formed by the lower end of the passageway 268. The port 219 in the sleeve 220, in the position of the sleeve as drawn, registers with the conduit 267 previously referred to. The conduit 267 branches into the conduit 251 i.e. to the suction side of the pump 252. A relief valve 271 is provided as shown, between the conduits 253 and 251 in association with the pump 252. A bleed 272 is taken from the conduit 267 back to the sump.

A coil spring 273 is interposed between a flange 274, which bears against the inner ends of the governor flyweights and is integral with the stem of the valve 213, and a fixed part 275.

The combined governor arrangement described is shown in Figure 6 in its equilibrium "on speed" condition. In operation hydraulic fluid is then withdrawn from the sump through the conduit 251 by the governor pump 252 and is discharged under pressure through the conduit 253 and port 255 to the left-hand side of the piston 256 in the cylinder 254. This pressure fluid also passes through the passageway 263 and annulus 264 to the port 218. In the on-speed condition, the land 215 closes this port 218. High pressure fluid however leaks from the annulus 264 past the shoulder 270 into the passage 268 and the annulus 265, a certain permissible leakage occurring all the time this combined governor is in an "on speed" condition. Supposing now that a speed disturbance occurs, and the speed of the turbine increases, the governor flyweights 207 move outwardly about their pivots 212 such that the flange 274 and thus the governor valve 213 are displaced to the left in the drawing against the effort of the coil spring 273. Consequently, the pressure fluid present at port 218 is permitted to pass into the annulus 223 and therefrom through port 225 and passageway 227 to the right-hand side of the piston 230 in the cylinder 229. Consequently the piston 230 moves to the left, the fluid on the left-hand side thereof passing through passageway 228, port 226, annulus 224, port 219 and conduits 267 and 251 to the suction side of the governor pump 252. In moving to the left, the piston 230 adjusts the arm 242 through the links 234, 237 and 240, such that the adjustable vanes 243 are closed by a small amount, this effecting decrease in the speed of the turbine. Such decrease in speed is, of course, not immediate and during the delay, certain other movements are occurring within the governor unit casing. Accordingly, as the piston 230 moves to the left, the lever 249 moves in an anticlockwise direction about the pivotal connection 262. This results in leftward movement of the sleeve 220 so that the movement of the valve 213 is followed up by the sleeve 220 until the port 218 is completely closed by the land 215. While this is occurring, however, pressure fluid present in the annulus 264 is leaking past the shoulder 270 into the annulus 265 and thus through conduits 266, 267 and 251 to the suction side of the pump, and also through the passageway 268 and orifice 269 to the right-hand side of the piston 256. It will be seen that as the sleeve 220 moves to the left, the high pressure fluid leakage to passageway 268 and annulus 265 is cut off and that that part of the cylinder 254 to the right of the piston 256 is subjected to suction through the orifice 269, passageway 268, annulus 265 and the conduits 266, 267 and 251. Hence the piston 256 and rod are displaced to the right so that the lever 259 moves in an anti-clockwise direction about the fixed pivot 260.

Thus it will be seen that although initially the sleeve 220 is moving to the left to follow up the leftward movement of the governor valve 213, as the governor flyweights 207 return to their equilibrium position at the end of the aforementioned delay in time for the turbine to return to its original speed, the piston 256 in moving to the right, controls the sleeve 220 in such a manner that it follows the governor valve, as the latter moves back to its original equilibrium position under the control of the flyweights.

It will be understood that the arrangement acts in the opposite sense if the speed disturbance is in the sense to reduce the speed of the turbine. In this case, however, the right-hand end of the cylinder 254 is not subjected to suction but is instead subjected to fluid under pressure from annulus 264 when the sleeve 220 is moved to the right. This, of course, results in leftward movement of the piston 256 and consequently clockwise movement of the link 259 to effect attainment of the original speed setting.

It will be understood that the hydraulic delivery pressure from the governor pump 252 is used as a datum or reference in the operation of the piston 256, the pump delivering fluid at a pressure proportional to the speed of the turbine.

Instead of providing a fixed area orifice 269, an orifice of variable area may be used so that by adjusting the area of the orifice the sensitivity of the system may be adjusted. A variable area orifice arrangement is shown in Figure 7 wherein the needle 269b may be adjusted to alter the effective area of the orifice 269a, the orifice being in the duct 268 as before.

In the case where the speed governing system is not required to return the speed of the turbine to a preselected speed following a disturbance in the speed of the turbine but merely to restore the turbine to a steady speed, the system described with reference to Figure 6 may be modified by omitting the piston 256, cylinder 254, passageway 268 and orifice 269, annuli 264 and 265 and lever 259. In this case the lever 249 would be pivoted at 262 to a fixed member such as 261 and the conduit 263 would communicate directly with the conduit 255.

I claim:

1. A speed governing system for a fluid turbine comprising turbine speed controlling means adjustable to alter the speed of the turbine, a casing, a sleeve slidable in a bore in said casing, a piston type valve member slidable in said sleeve, a centrifugal governor connected to be driven with the turbine at a speed proportional to the speed thereof and to adjust the position of said valve member relative to said sleeve upon change of speed of the turbine, an hydraulic servo motor connected to adjust said turbine speed controlling means and operable under the control of said valve member when said valve member is displaced relative to said sleeve, means for transmitting movements of said servo-motor to said sleeve such that said sleeve follows up said valve member, speed responsive governing means responsive to a difference between the actual speed of the turbine and a preselected speed, for adjusting the datum of said centrifugal governor in the sense to cause the elimination of such difference, and means for delaying the operation of said speed responsive governing means.

2. A speed governing system for a fluid turbine comprising turbine speed controlling means adjustable to alter the speed of the turbine, a casing, a sleeve slidable in a bore in said casing, a piston type valve member slidable in said sleeve, a centrifugal governor connected to be driven with the turbine at a speed proportional to the speed thereof and to adjust the position of said valve member relative to said sleeve upon change of speed of the turbine, an hydraulic servo motor connected to adjust said turbine speed controlling means and operable under the control of said valve member when said valve member is displaced relative to said sleeve, means for transmitting movements of said servo motor to said sleeve such that said sleeve follows up said valve member, speed correcting means responsive to a difference between the actual speed of the turbine and a preselected speed for returning said sleeve to its initial position, and means for delaying the operation of said speed correcting means.

3. A speed governing system for a fluid turbine, comprising turbine speed controlling means adjustable to alter the speed of the turbine, a casing, a sleeve slidable in a bore in said casing, a piston type valve member slidable in said sleeve, a centrifugal governor connected to be driven with the turbine at a speed proportional to the speed thereof and to adjust the position of said valve member relative to said sleeve upon change of speed of the turbine, a first hydraulic servo motor connected to adjust said turbine speed controlling means and operable under the control of said valve member when said valve member is displaced relative to said sleeve, means for transmitting movements of said servo motor to said sleeve such that said sleeve follows up said valve member, a second hydraulic servo motor, a port in said bore, an outwardly directed shoulder on said sleeve separating high and low pressure spaces, a source of hydraulic fluid under pressure, conduit means communicating said high pressure space with one side of said second servo motor, conduit means communicating said one side of said second servo motor with said source, duct means communicating said port with the other side of said second servo motor, said shoulder normally closing said port but allowing a predetermined leakage of fluid from said high pressure space into said duct means and into said low pressure space when in its position closing said port, an orifice in said duct means operative to delay the operation of said second servo motor when said sleeve is moved so that said shoulder uncovers said port, and means for transmitting movements of said second servo motor to said sleeve to return the sleeve to its position closing said port.

4. A speed governing system as claimed in claim 3, wherein said orifice is of adjustable area to vary the sensitivity of the system.

5. A speed governing system for a fluid turbine, comprising turbine speed controlling means adjustable to alter the speed of the turbine, a casing, a sleeve slidable in a bore in said casing, a piston type valve member slidable in said sleeve, a centrifugal governor connected to be driven with the turbine at a speed proportional to the speed thereof to adjust the position of said valve member relative to said sleeve upon change of speed of the turbine, a first hydraulic servo motor connected to adjust said turbine speed controlling means and operable under the control of said valve member when said valve member is displaced relative to said sleeve, a second hydraulic servo motor, a port in said bore, an outwardly directed shoulder on said sleeve separating high and low pressure spaces, a hydraulic fluid pump connected to be driven with said centrifugal governor to deliver hydraulic fluid at a pressure proportional to the speed of the turbine, conduit means communicating said high pressure space with one side of said second servo motor, conduit means communicating said one side of said second servo motor with the delivery side of said pump, conduit means communicating said low pressure space with the suction side of said pump, duct means communicating said port with the other side of said second servo motor, said shoulder normally closing said port but allowing a predetermined leakage of fluid from said high pressure space into said duct means and into said low pressure space when in its position closing said port, an orifice in said duct means operative to delay the operation of said second servo motor when said sleeve is moved so that said shoulder uncovers said port, a first differential lever pivoted at one end to a fixed support and at its other end to one end of a second differential lever operatively connected at its other end with said first hydraulic servo motor, said first differential lever being operatively connected intermediate its ends with said second hydraulic servo motor, and said second differential lever being connected intermediate its ends with said sleeve whereby said sleeve is moved by said first hydraulic servo motor to follow up said valve member, and by said second hydraulic servo motor to return the sleeve to its position closing said port.

6. A speed governing system for a fluid turbine, comprising turbine speed controlling means adjustable to alter the speed of the turbine, a casing, a sleeve slidable in a bore in said casing, a piston type valve member slidable in said sleeve, a centrifugal governor connected to be driven with the turbine at a speed proportional to the speed thereof and to adjust the position of said valve member relative to said sleeve upon change of speed of the turbine, a first piston-and-cylinder assembly of which the piston is displaceable under the control of said valve member when said valve member is displaced relative to said sleeve, means operatively connecting the piston of said piston-and-cylinder assembly with said turbine speed controlling means, a second piston-and-cylinder assembly, a port in said bore, an outwardly directed shoulder on said sleeve separating high and low pressure spaces, a hydraulic fluid pump connected to be driven with said centrifugal governor to deliver hydraulic fluid at a pressure proportionate to the speed of the turbine, conduit means communicating said high pressure space with the delivery side of said pump, said conduit means including the cylinder space on one side of the piston of said second piston-and-cylinder assembly, conduit means communicating said low pressure space with the suction side of said pump, duct means communicating said port with the cylinder space on the other side of the piston of said second piston-and-cylinder assembly, said shoulder normally closing said port but allowing a predetermined leakage of fluid from said high pressure space into said duct means and into said low pressure space when in its position closing said port, an orifice in said duct means operative to delay the operation of said second piston-and-cylinder assembly, a first differential lever pivoted at one end to a fixed support and at its other end to one end of a second differential lever connected at its other end with the piston of said first piston-and-cylinder assembly, said first differential lever being connected intermediate of its ends with the piston of said second piston-and-cylinder assembly and said second differential lever being connected at a point intermediate its ends with said sleeve whereby said sleeve is moved by the piston of said first piston-and-cylinder assembly to follow up said valve member, and by the piston of said second piston and cylinder assembly to return the sleeve to its position closing said port.

References Cited in the file of this patent
UNITED STATES PATENTS

| | | |
|---|---|---|
| 1,864,127 | Flanders | June 21, 1932 |
| 1,901,831 | Kerr | Mar. 4, 1933 |
| 1,920,752 | Kissing et al. | Aug. 1, 1933 |
| 2,224,321 | Schwendner | Dec. 10, 1940 |
| 2,309,892 | Gabalis et al. | Feb. 2, 1943 |
| 2,542,765 | Gillespie | Feb. 20, 1951 |
| 2,602,655 | Gesner | July 8, 1952 |
| 2,705,047 | Williams et al. | Mar. 29, 1955 |
| 2,727,523 | Brown | Dec. 20, 1955 |